(12) United States Patent
Kiersten et al.

(10) Patent No.: US 12,510,384 B2
(45) Date of Patent: Dec. 30, 2025

(54) SENSOR ASSEMBLY FOR A VEHICLE (71) Applicant: Robert Bosch GmbH, Stuttgart (DE)

(72) Inventors: Axel Kiersten, Oberstenfeld (DE);
Eduard Maiterth, Heilbronn (DE);
Matthias Letzgus, Rosenberg (DE);
Mario Loritz, Bretzfeld (DE); Mathias Nestmeyer, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 18/491,776

(22) Filed: Oct. 22, 2023

(65) Prior Publication Data
US 2024/0142279 A1 May 2, 2024

(30) Foreign Application Priority Data

Oct. 26, 2022 (DE) ...................... 10 2022 211 328.4

(51) Int. Cl.
*G01D 11/24* (2006.01)
*H01R 13/05* (2006.01)
*H01R 13/422* (2006.01)

(52) U.S. Cl.
CPC ............ *G01D 11/245* (2013.01); *H01R 13/05* (2013.01); *H01R 13/422* (2013.01)

(58) Field of Classification Search
CPC ..... G01D 11/245; H01R 13/05; H01R 13/422
See application file for complete search history.

(56) References Cited

U.S. PATENT DOCUMENTS

2013/0192361 A1* 8/2013 Herderich ............ G01D 11/245
73/431

FOREIGN PATENT DOCUMENTS

DE 202014106056 U1 * 1/2015 ......... H01R 13/5219
DE 102014202192 A1 * 8/2015 ................ G01P 1/02
(Continued)

*Primary Examiner* — Jamel E Williams
(74) *Attorney, Agent, or Firm* — Maginot, Moore & Beck LLP (57) ABSTRACT

A sensor assembly for a vehicle includes (i) a plug assembly which having a plug housing and at least two plug pins and forms an external interface of the sensor assembly, (ii) a circuit carrier on which an electronic circuit corresponding to a sensor concept being implemented is arranged, and (iii) a sensor housing which comprises an insertion opening. The circuit carrier is connected to the plug housing and the at least two plug pins at a first interface. The sensor housing includes a second interface having an opening via which the sensor housing can be connected to an external sensor arrangement or a cover according to the sensor concept being implemented, which covers the opening of the third interface in the unused state. The circuit carrier is inserted into the sensor housing through the insertion opening which is connected to the plug housing via a third interface. The circuit carrier is pre-fixed at an end region of the sensor housing. A guide element guides the circuit carrier on a first side and at least one spring element adjoins a second side opposite the first side and presses and fixes the circuit carrier against the guide element. The first interface and the external interface are arranged according to a function of a communication protocol being implemented. The second interface and the third interface are designed in the same way, independent of the sensor concept being implemented and the communication protocol being implemented. An associated method for mounting such a sensor assembly is also disclosed.

12 Claims, 5 Drawing Sheets

(56) References Cited

FOREIGN PATENT DOCUMENTS

| DE | 102017113711 A1 | * | 1/2019 | ............. F16D 25/08 |
| EP | 2232222 B1 | * | 6/2011 | ......... G01L 19/0084 |
| WO | WO-2015071028 A1 | * | 5/2015 | ........... G01D 11/245 |
| WO | WO-2017215917 A1 | * | 12/2017 | ............. G01D 11/24 |
| WO | WO-2024153609 A1 | * | 7/2024 | ........... H01R 43/005 |

* cited by examiner

SENSOR ASSEMBLY FOR A VEHICLE

This application claims priority under 35 U.S.C. § 119 to patent application no. DE 10 2022 211 328.4, filed on Oct. 26, 2022 in Germany, the disclosure of which is incorporated herein by reference in its entirety.

The disclosure relates to a sensor assembly for a vehicle. The object of the present disclosure is a method for assembling such a sensor assembly for a vehicle.

BACKGROUND

Sensor assemblies having a sensor housing and a plug assembly having a plug housing are known from the prior art. In this context, the plug housing having integrated plug connectors can be designed as an injection molding housing having inserts for the electrical contacts or as an injection molding housing having press-in contact pins pressed in. Plug housings with inserts in the injection molding process typically bring about higher costs than plug housings with pressed-in contacts, because the insertion process in the injection molding machine leads to lower cycle times and additional effort is required for handling the inserts (robots or the like). In order to produce different sensor housing variants (width, height, different bolting points, etc.) with plug connections, different injection molding tools are usually required for the housings despite the same external plug interface. For sensors with a so-called A2B interface, special requirements apply for the electrical properties of the connectors. Due to the high transmission frequency of the external interface (similar to the 100 Mbit network interface), the distance between the plug pins must be kept small. This restricts the choice of plug connectors from the open market. Customers usually have very different requirements for the sensor assemblies to implement desired sensor concepts. In addition, different external interfaces may be required for different data bus topologies and for executing different communication protocols. This results in a plurality of different design variants of the sensor assembly.

DE 10 2014 202 192 A1 describes a sensor unit for a vehicle with a base body, which supports a sensor circuit with at least one sensor contact and comprises, at a first end, a sensor contact which is electrically connected to the at least one sensor contact via at least one sensor contact and, at a second end, a cable contact which is electrically connected to a connection cable via at least one cable contact. The sensor contact and the cable contact are arranged on a common contact carrier. Here, the sensor circuit is arranged at an end region of the contact carrier, such that the sensor circuit is aligned in a desired direction of detection. The direction of detection is pre-determined by a bending angle of the end region of the contact carrier towards the longitudinal axis of the base body, wherein the sensor contact with the sensor circuit is surrounded by a pot-shaped sleeve fixed to the base body, the shape of which is adapted to the direction of detection of the sensor circuit.

SUMMARY

The sensor assembly for a vehicle with the features set forth below has the advantage that a flexible housing concept for different sensor applications or sensor concepts is provided. In this case, only small parts of the overall housing are replaced on a variant-specific basis. Many different variants of the sensor assembly can be created by the combination of different parts. The manufacturing line can be designed so that all variants can be manufactured on a one line. Using the present proposal for a sensor kit, a wide range of sensor assemblies can be produced by combining different housing parts. The principle of operation is always similar in design, and the same production systems can be used. By way of the plug assembly, an external interface of the sensor assembly can be adjusted in advance to a bus topology desired by the customer, while a mechanical interface between the sensor housing and the plug housing is implemented in the same way. For example, two-pole or four-pole or eight-pole plug connectors can be provided, which can meet corresponding requirements for signal transmission and communication protocols. Of course, blade bars or similar contact assemblies can also be used as an external interface of the sensor assembly.

Embodiments of the present disclosure provide a sensor assembly for a vehicle having a plug assembly comprising a plug housing and at least two plug pins and forming an external interface of the sensor assembly, a circuit carrier on which an electronic circuit corresponding to a sensor concept being implemented is arranged, and a sensor housing, which comprises an insertion opening. The circuit carrier is connected to the plug housing and the at least two plug pins at a first interface. The sensor housing comprises a second interface having an opening, via which the sensor housing can be connected to an external sensor arrangement or a cover, which covers the opening of the second interface in the unused state according to the sensor concept being implemented. The circuit carrier is inserted into the sensor housing through the insertion opening, which is connected to the plug housing via a third interface. The circuit carrier is pre-fixed to an end region of the sensor housing, wherein at least one guide element guides the circuit carrier on a first side and at least one spring element adjoins on a second side opposite the first side and presses and fixes the circuit carrier against the at least one guide element. The first interface and the external interface are designed according to a communication protocol being implemented. The second interface and the third interface are designed independent of the sensor concept being implemented and the communication protocol being implemented.

In addition, a method for assembling such a sensor assembly for a vehicle is proposed. In this case, a sensor housing and, according to a sensor concept being implemented and a communication protocol being implemented, a plug assembly and a circuit carrier are provided. The plug assembly and the circuit carrier are connected to each other at a first interface. The circuit carrier is inserted into an insertion opening of the sensor housing until the plug housing and the sensor housing are connected to each other at a third interface and the circuit carrier is pre-fixed at an end region of the sensor housing. According to the sensor concept being implemented, an external sensor arrangement or a cover is connected to the sensor housing at the second interface.

By way of embodiments of the sensor assembly, for example, an A2B interface can also be easily implemented as an external interface, in which the required plug pins are placed in the plug housing with as small a distance as possible, in order to be able to implement a high transmission frequency of the external interface similar to a network interface (100 Mbit). Furthermore, the external interface of the sensor assembly can be designed as a MOST bus interface, 100BASE-T1 interface, PSIS interface, CAN interface, CAN FD interface, VIAS interface, etc.

The second interface of the sensor housing makes it easy to implement different customer requirements for the sensor assemblies. For example, the sensor housing can be connected to a cover that covers the opening of the second interface in the unused state. This can be the case, for example, if an internal sensor arrangement is sufficient as part of the electronic circuitry on the circuit carrier to implement the desired sensor concept and no further external sensor arrangement is required. Alternatively, according to the sensor concept being implemented, various external sensor arrangements can be electrically and mechanically connected to the sensor housing via the second interface. For example, speed sensors can be flanged to the second interface as external sensor arrangements having an ASIC (ASIC: application-specific integrated circuit) or redundantly with two ASICs or with an ASIC having two sensor elements, temperature sensors, microphones, etc. The speed sensors can be equipped with HALL, AMR, GMR, TMR or comparable measurement technology. The form of the speed sensor can vary in length, reading direction, diameter, be with or without O-ring, etc. The electrical contacting of the external sensor arrangement can occur, for example, via contact springs fitted on the circuit carrier. A press-in technique or plug contacts for contacting the flanged external sensor arrangement are also conceivable. If no electrical contacting with the circuit carrier of the sensor assembly is required, retaining pins can be arranged on the outside of the cover, to which, for example, a sensor for accelerometer measurement and/or for noise measurement (road noise sensor system) can be flanged.

The plug housing and the sensor housing of the sensor assembly can preferably each be designed as plastic injection molding components. Doing so enables simple and cost-effective manufacturing in large quantities. The pre-fixation of the circuit carrier in the end region of the sensor housing is preferably carried out during assembly via two guide elements designed as compression ribs.

The at least one spring element can be understood to mean, for example, mechanical springs, such as barrel springs, coil springs, S-springs, etc., or elastic plastic elements, such as rubber balls, silicone tubes, etc., which are suitable for pushing and fixing the circuit carrier against the at least one guide element.

The electronic circuit can be understood to mean, for example, an evaluation and control circuit which processes or evaluates detected sensor signals. The electronic circuit can comprise at least one interface, which can be designed in the form of hardware and/or software. In the case of a hardware design, the interfaces can, e.g., be part of what is referred to as an ASIC system, which contains various functions of the electronic circuit. However, it is also possible that the interfaces be separate integrated circuits, or consist at least in part of discrete components. In a software design, the interfaces can, e.g., be software modules provided on a microcontroller alongside other software modules. Also advantageous is a computer program product comprising program code stored on a machine-readable carrier, e.g., a semi-conductor memory, a hard disk memory, or an optical memory and used in order to perform the evaluation when the program is executed by the electronic circuit.

Advantageous improvements to the sensor assembly for a vehicle specified below and the method specified below are enabled by the measures and embodiments described herein.

It is particularly advantageous that the number and arrangement of the at least two plug pins of the plug assembly can be adjusted to the communication protocol being implemented.

In one advantageous embodiment of the sensor assembly, the at least one spring element can be arranged in the area of the second interface between the circuit carrier and the sensor housing. The at least one spring element can thereby support itself on the external sensor arrangement or on the cover. In a flanged external sensor arrangement, the at least one spring element can be designed as a contact spring, which electrically connects the external sensor arrangement, which is connected to the sensor housing at the second interface, to the circuit support. Preferably, the contact spring can be designed as a barrel spring or as an S spring. In such an embodiment, the at least one spring element advantageously assumes the electrical contacting of the external sensor arrangement in addition to fixing the circuit carrier. Additionally or alternatively, the at least one spring element, in particular in combination with the cover, can be designed, for example as a rubber ball, silicone tube, coil spring, etc.

In another advantageous embodiment of the sensor assembly, the at least two plug pins of the plug assembly can be pressed into the plug housing and electrically conductively connected to at least one conductive track structure of the circuit carrier. This contacting of the at least two plug pins additionally assumes the mechanical fixation of the circuit carrier on the plug side. In order to minimize load on the contact locations, the plug housing in the area of the first interface can comprise at least one support element, which the circuit carrier adjoins. For example, the at least one support element can be attached or formed to the plug housing as an additional support lug.

In another advantageous embodiment of the sensor assembly, the external sensor arrangement and/or the plug housing can be connected in a fluidically sealed manner to the sensor housing via a weld connection, or via an adhesive connection, or via a screw connection, or via a press-fit connection, or via a hot melt connection. In other words, the external sensor arrangement or cover at the second interface can be connected in a fluidically sealed manner to the sensor housing via a welded connection, or via an adhesive connection, or via a screw connection, or via a press-fit connection, or via a hot melt connection, or via a combination of the connection techniques specified. The plug housing can be connected in a fluidically sealed manner to the sensor housing at the second interface via a welded connection, or via an adhesive connection, or via a screw connection, or via a press-fit connection, or via a hot melt connection, or via a combination of the connection techniques specified.

In a further advantageous embodiment of the sensor assembly, the third interface can comprise a circumferential first collar formed on the plug housing and a circumferential second collar formed on the sensor housing, which overlap each other in the joined state.

In another advantageous embodiment of the sensor assembly, at least one fastening tab can be formed on the sensor housing, which makes it easy to implement a screw-on point for the sensor assembly with a pressed-in or over-molded or glued bushing. In addition, the use of a loss-proof screw is also conceivable. For example, as a second attachment point, compression ribs or an outer geometry of the sensor housing can be employed. Alternatively, the cover can be implemented with a retaining pin for a blind hole or sheet mounting as a second attachment point. Alternatively, the attachment can also be done with rivets.

In an advantageous embodiment of the method, the at least one spring element can be arranged between the circuit carrier and the sensor housing prior to connecting the external sensor arrangement or the cover in the area of the third interface such that the spring element can support itself on the external sensor arrangement or the cover in the mounted state, and the circuit carrier can push and fix itself against the at least one guide element. In the contact spring design, the at least one spring element can be fitted on the circuit carrier, for example. In combination with the cover, the at least one spring element can be attached to the inside of the cover.

BRIEF DESCRIPTION OF THE DRAWINGS

Exemplary embodiments of the disclosure are illustrated in the drawings and explained in greater detail in the subsequent description. In the drawings, identical reference characters refer to components or elements performing identical or similar functions.

DETAILED DESCRIPTION

As seen in FIGS. 1 to 6, the illustrated exemplary embodiment of a sensor assembly 1 for a vehicle according to the disclosure comprises a plug assembly 10, which comprises a plug housing 11 and at least two plug pins 18 and forms an external interface 9 of the sensor assembly 1, a circuit carrier 14, on which an electronic circuit 16 corresponding to a sensor concept being implemented is arranged, and a sensor housing 20, which comprises an insertion opening 22. The circuit carrier 14 is connected to the plug housing 11 and the at least two plug pins 18 at a first interface 3. The sensor housing 20 comprises a second interface 5 with an opening 25, via which the sensor housing 20 can be connected to an external sensor arrangement 30 or a cover, which covers the opening 25 of the second interface 5 in the unused state, according to the sensor concept being implemented. The circuit carrier 14 is inserted into the sensor housing 20 through the insertion opening 22, which is connected to the plug housing 11 via a third interface 7. The circuit carrier 14 is pre-fixed to an end region of the sensor housing 20. In this case, at least one guide element 24 guides the circuit carrier 14 to a first side and at least one spring element 26 adjoins a second side opposite the first side and pushes and fixes the circuit carrier 14 against the at least one guide element 24. The first interface 3 and the external interface 9 are designed as a function of a communication protocol being implemented. The second interface 5 and the third interface 7 are designed independent of the sensor concept being implemented and the communication protocol being implemented.

The plug housing 11, which comprises a plug opening 11.1 for inserting a plug not shown in more detail, and the sensor housing 20 are respectively embodied as plastic injection molding components in the illustrated embodiment of the sensor assembly 1.

The number and arrangement of the at least two plug pins 18 of the plug assembly 10 are adaptable to the communication protocol being implemented. In the illustrated exemplary embodiment of the plug assembly 10, eight plug pins 18 are pressed into corresponding contact openings 11.2 of the plug housing 11. As further seen, in particular in FIG. 3, the circuit carrier 14 comprises a contact area 14.1 with eight unspecified vias, into which the eight plug pins 18 can be pressed. Alternatively, the plug pins 18 can be soldered into the vias. Using the vias, the plug pins 18 are electrically connected to at least one conductive track structure of the circuit carrier 14 (not shown in detail). In the illustrated exemplary embodiment, an ASIC component 16A is arranged on the circuit carrier 14 as part of the electronic circuitry. Of course, the electronic circuitry can also comprise further active or passive electronic components not shown in more detail herein.

The plug housing 11 comprises at least one support element 15, which the circuit carrier 14 adjoins in order to relieve the contacting of the plug pins 18 in the area of the first interface 3. As further seen, in particular in FIGS. 2 to 4, two support elements 15 designed as support tabs 15A in the illustrated exemplary embodiment are formed on the plug housing 11, which the circuit carrier 14 adjoins with an end face and with its first side, in this case the upper side.

In the illustrated exemplary embodiment of the sensor assembly 1, the external sensor arrangement 30, which is in this case designed as a speed sensor 30A, and the plug housing 11 are each connected in a fluidically sealed manner to the sensor housing 20 via a plastic weld connection. As seen in particular in FIGS. 1 and 2, the external sensor arrangement 30, embodied as speed sensors 30A, is connected in a fluidically sealed manner to the sensor housing 20 at the second interface 5 via the plastic weld connection. The plug housing 11 is connected in a fluidically sealed manner to the sensor housing 20 at the third interface 7 via a plastic weld joint. In an exemplary embodiment (not shown), the sensor assembly 1 without an external sensor arrangement 30 is connected in a fluidically sealed manner to the sensor housing 20 at the second interface 5 via an adhesive connection. Of course, the external sensor arrangement 30 or the cover and/or the plug housing 11 can also be connected in a fluidically sealed manner to the sensor housing 20 via other connection techniques, e.g., via a welded connection, or via an adhesive connection, or via a screw connection, or via a hot bar connection, or a press-fit connection, or via a combination of the connection techniques specified.

As further seen in FIGS. 1 to 5, the third interface 7 comprises a circumferential first collar 12 formed on the plug housing 11 and a circumferential second collar 23 formed on the sensor housing 20, which overlap each other in the joined state. In addition, the circumferential second collar 23 of the sensor housing 20 adjoins a connection region 13 of the plug housing 11 and is connected in a fluidically sealed manner to the plug housing 11 at the connection region 13 via a plastic weld connection. As seen in particular in FIGS. 2 and 5, the circuit carrier 14 is arranged between two guide elements 26, which are designed as press-in ribs and are guided by the latter upon insertion into an insertion opening 22 of the sensor housing 20. In the joined state, the circuit carrier 14 thereby adjoins a first guide element 26A on a first (in this case the upper) side, and is pressed against the first guide element 26A by two spring elements 26, which are designed as contact springs 26A, in the area of the second interface 5. In the end region of the sensor housing 20, the circuit carrier 14 is clamped between the first guide element 24A and a second guide element 24B, which adjoins the second (in this case the lower) side, of the circuit carrier 14. The spring element 26, which is in this case designed as a contact spring 26A, supports itself on the external sensor arrangement 30. The contact springs 26A electrically connect the external sensor arrangement 30 connected to the sensor housing 20 at the second interface 5 to the circuit carrier 14. In an alternative exemplary embodiment of the sensor assembly 1 without an external sensor arrangement 30, the at least one spring element 26 rests on the cover, which closes the opening 25.

Figure 1:
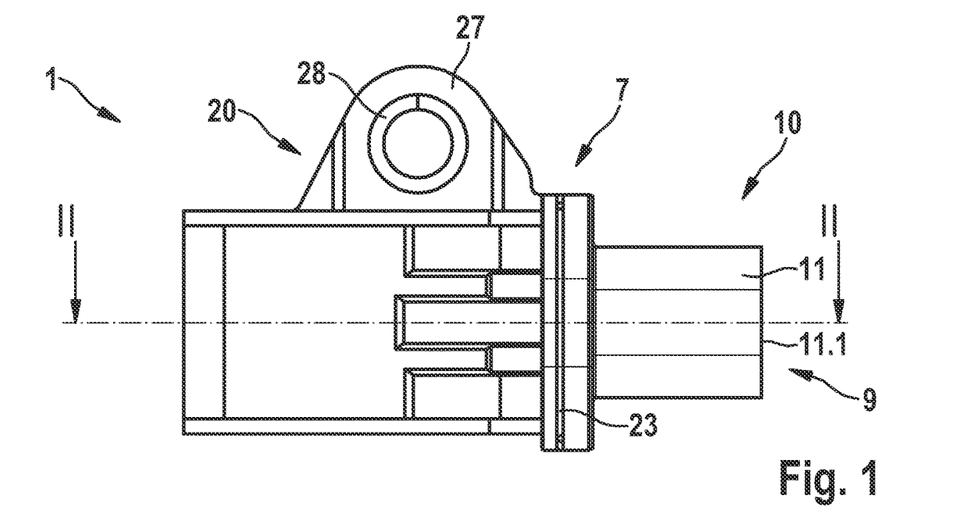
FIG. 1 shows a schematic top view of an exemplary embodiment of a sensor assembly for a vehicle according to the disclosure.
Figure 2:
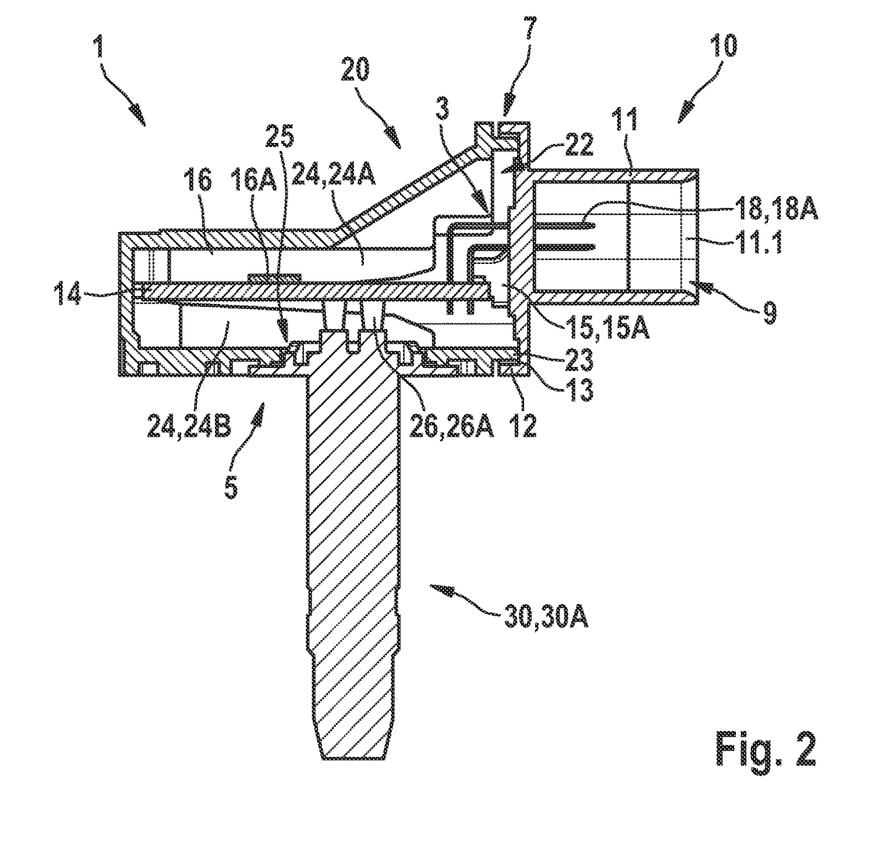
FIG. 2 shows a schematic sectional view of the sensor assembly of FIG. 1 according to the disclosure along the interface II-II.
Figure 3:
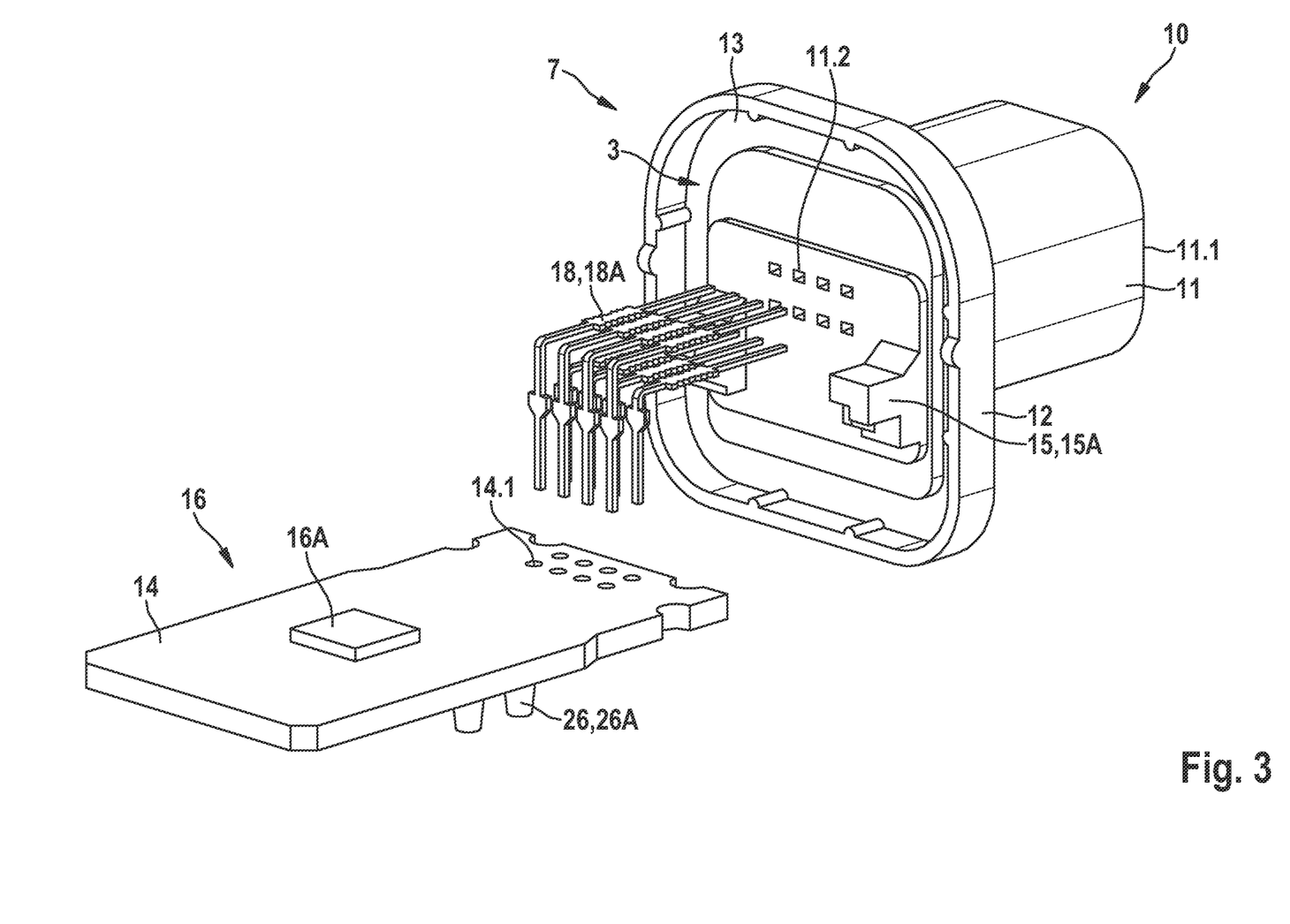
FIG. 3 shows a perspective view of a circuit carrier and components of a plug assembly of the sensor assembly according to the disclosure of FIGS. 1 and 2.
Figure 4:
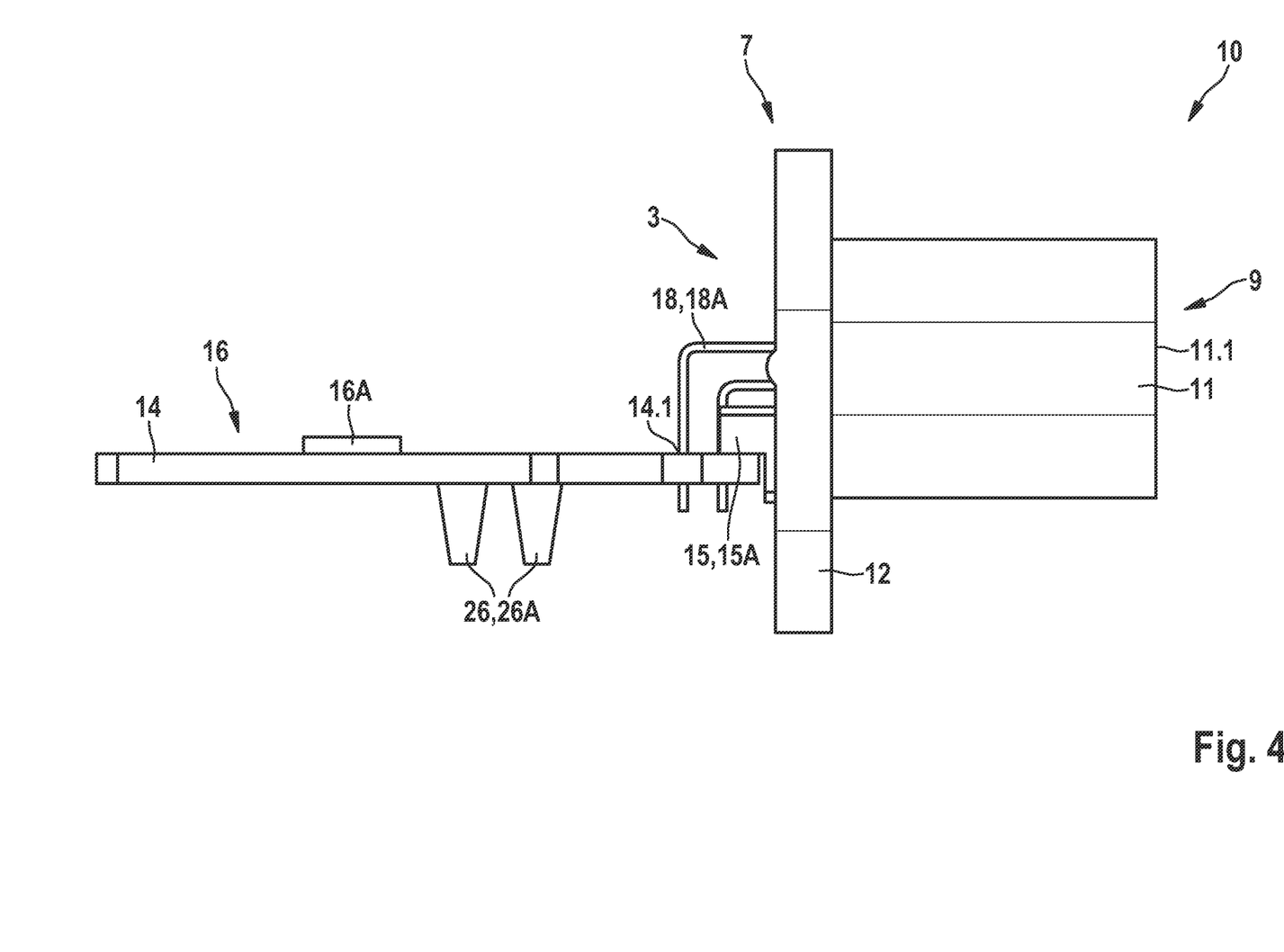
FIG. 4 shows a side view of the circuit carrier of FIG. 3 connected to the plug assembly of FIG. 3.
Figure 5:
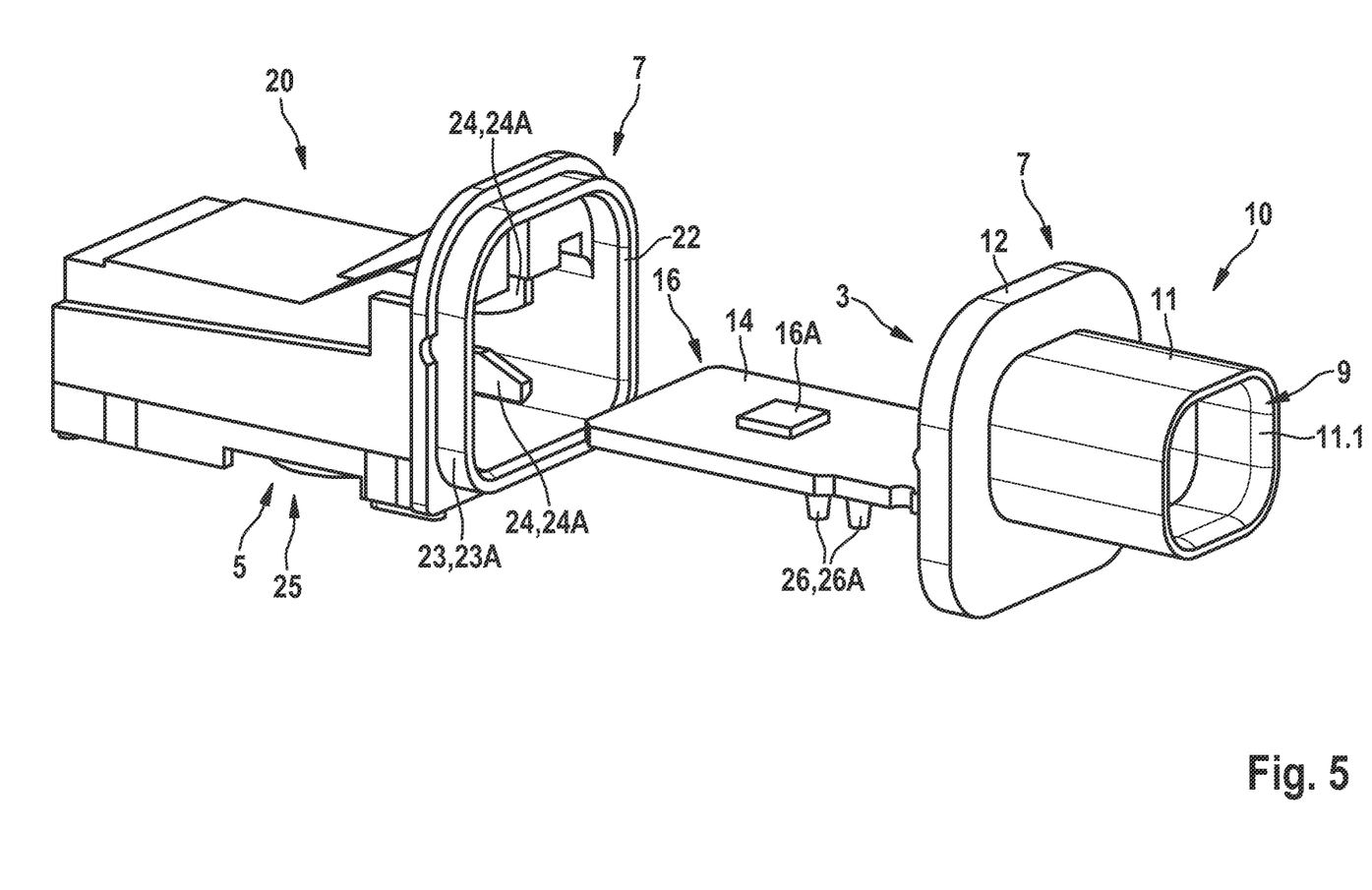
FIG. 5 shows a perspective view of the plug assembly with the connected circuit carrier prior to inserting the circuit carrier into a sensor housing of the sensor assembly according to the disclosure of FIGS. 1 and 2.

As further seen in FIG. 1 in the illustrated exemplary embodiment of the sensor assembly 1, a fastening tab 27 is formed on the sensor housing 20. A fastening bushing 28 is in this case over-molded by the fastening tab. To fasten the sensor assembly, a screw can be passed through the fastening bushing 8 and the sensor assembly 1 can be screwed at the installation location.

Figure 6:
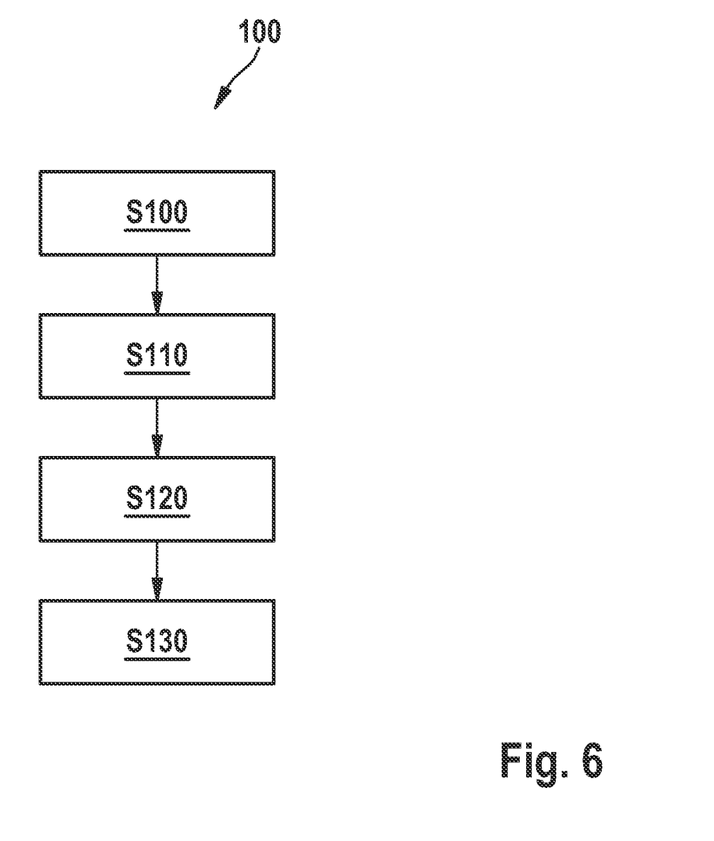
FIG. 6 shows a schematic flowchart of an exemplary embodiment of a method for assembling a sensor assembly for a vehicle according to the disclosure.

As further seen in FIG. 6, the illustrated exemplary embodiment of a method 100 according to the disclosure for mounting such a sensor assembly 1 for a vehicle comprises a step S100, in which a sensor housing 20 is provided. According to a sensor concept being implemented and a communication protocol being implemented, a plug assembly 10 and a circuit carrier 14 are provided in step S100. In step S110, the plug assembly 10 and the circuit carrier 14 are connected to each other at a first interface 3. In step S120, the circuit carrier 14 is inserted into an insertion opening 22 of the sensor housing 20 until the plug housing 11 and the sensor housing 20 are connected to each other at a third interface 7 and the circuit carrier 14 is pre-fixed at an end region of the sensor housing 20. In step S130, an external sensor arrangement 30 or a cover is connected to the sensor housing 20 at the second interface 5 according to the sensor concept being implemented.

In addition, the at least one spring element 26 is arranged between the circuit carrier 14 and the sensor housing 20 prior to connecting the external sensor arrangement 30 or the cover in the area of the third interface 7 such that the spring element 26 can support itself on the external sensor arrangement 30 or the cover in the mounted state and the circuit carrier 14 can push and fix itself against the at least one guide element 24. The at least one spring element 26 can, e.g., be attached to the circuit carrier 14, or to the sensor assembly 30, or to the cover.

What is claimed is:

1. A sensor assembly for a vehicle, comprising:
a plug assembly including a plug housing and at least two plug pins, wherein the plug assembly is configured to form an external interface of the sensor assembly;
a circuit carrier on which an electronic circuit corresponding to a sensor concept being implemented is arranged; and
a sensor housing including an insertion opening,
wherein the circuit carrier is connected to the plug housing and the at least two plug pins at a first interface,
wherein the sensor housing includes a second interface having an opening via which the sensor housing is configured to be connected to (i) an external sensor arrangement or (ii) a cover according to the sensor concept being implemented which covers the opening of the second interface in an unused state,
wherein the circuit carrier is configured to be inserted into the sensor housing through the insertion opening which is connected to the plug housing via a third interface,
wherein the circuit carrier is pre-fixed at an end region of the sensor housing,
wherein at least one guide element is configured to guide the circuit carrier on a first side, and at least one spring element adjoins on a second side opposite the first side and is configured to press and fix the circuit carrier against the at least one guide element,
wherein the first interface and the external interface are arranged according to a communication protocol being implemented, and
wherein the second interface and the third interface are designed in the same way, independent of the sensor concept being implemented and the communication protocol being implemented.

2. The sensor assembly according to claim 1, wherein the number and arrangement of the at least two plug pins of the plug assembly are adaptable to the communication protocol being implemented.

3. The sensor assembly according to claim 1, wherein the at least one spring element is arranged in the area of the second interface between the circuit carrier and the sensor housing.

4. The sensor assembly according to claim 3, wherein the at least one spring element supports itself on the external sensor arrangement or on the cover.

5. The sensor assembly according to claim 1, wherein the at least one spring element is designed as a contact spring which electrically connects the external sensor arrangement connected to the sensor housing at the second interface to the circuit carrier.

6. The sensor assembly according to claim 1, wherein the at least two plug pins of the plug assembly are pressed into the plug housing and electrically conductively connected to at least one conductor track structure of the circuit carrier.

7. The sensor assembly according to claim 1, wherein the plug housing in the area of the first interface comprises at least one support element which the circuit carrier adjoins.

8. The sensor assembly according to claim 1, wherein the third interface comprises a circumferential first collar formed on the plug housing and a circumferential second collar formed on the sensor housing which overlap each other in the joined state.

9. The sensor assembly according to claim 1, wherein the external sensor arrangement, or the cover, and/or the plug housing are connected in a fluidically sealed manner to the sensor housing via a welded connection, or via an adhesive connection, or via a press-in connection, or via a hot melt connection, or via a combination thereof.

10. The plug assembly according to claim 1, wherein at least one fastening tab is formed on the sensor housing.

11. A method for assembling a sensor assembly for a vehicle, which is designed according to claim 1, wherein a sensor housing and, according to a sensor concept being implemented and a communication protocol being implemented, a plug assembly and a circuit carrier are provided, wherein the plug assembly and the circuit carrier are connected to each other at a first interface, wherein the circuit carrier is inserted into an insertion opening of the sensor housing until the plug housing and the sensor housing are connected to each other at a third interface and the circuit carrier is pre-fixed at an end region of the sensor housing, wherein, according to the sensor concept being implemented, an external sensor arrangement or a cover is connected to the sensor housing at the second interface.

12. The method according to claim 11, wherein the at least one spring element is arranged between the circuit carrier and the sensor housing prior to connecting the external sensor arrangement or the cover in the area of the third interface, such that the spring element supports the external sensor arrangement or the cover in the mounted state and presses and fixes the circuit carrier against the at least one guide element.

\* \* \* \* \*